US010534942B1

(12) United States Patent
Cornell et al.

(10) Patent No.: US 10,534,942 B1
(45) Date of Patent: Jan. 14, 2020

(54) METHOD AND APPARATUS FOR CALIBRATING A CLIENT COMPUTING DEVICE FOR DECODING SYMBOLS

(71) Applicant: Zebra Technologies Corporation, Lincolnshire, IL (US)

(72) Inventors: Andrew Cornell, East Northport, NY (US); Sherry George, Leonia, NJ (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/109,936

(22) Filed: Aug. 23, 2018

(51) Int. Cl.
*G06K 7/10* (2006.01)
*G06K 7/14* (2006.01)

(52) U.S. Cl.
CPC ....... *G06K 7/10722* (2013.01); *G06K 7/1413* (2013.01)

(58) Field of Classification Search
CPC .......................... G06K 7/10722; G06K 7/1413
USPC ............. 235/462.41, 462.25, 462.15, 462.24
See application file for complete search history.

(56) References Cited

U.S. PATENT DOCUMENTS

| 5,608,202 | A  | * | 3/1997  | Bridgelall | G06K 7/10564 |
|           |    |   |         |            | 235/462.06   |
| 6,616,039 | B1 | * | 9/2003  | Saporetti  | G06K 7/10722 |
|           |    |   |         |            | 235/454      |
| 7,296,749 | B2 |   | 11/2007 | Massieu    |              |
| 9,547,785 | B2 |   | 1/2017  | Lai        |              |
| 9,679,175 | B2 |   | 6/2017  | Lei        |              |
| 10,146,975 | B2 | * | 12/2018 | Canini     | G06K 7/10831 |
| 2002/0185540 | A1 | * | 12/2002 | Hashimoto | G06K 7/10851 |
|              |    |   |         |           | 235/462.25   |
| 2003/0057282 | A1 | * | 3/2003  | Brandt    | G06K 7/14    |
|              |    |   |         |           | 235/462.07   |
| 2004/0206821 | A1 | * | 10/2004 | Longacre, Jr. | G06K 7/10851 |
|              |    |   |         |           | 235/462.07   |
| 2007/0002163 | A1 | * | 1/2007  | Madej     | G06K 7/10    |
|              |    |   |         |           | 348/362      |
| 2007/0119941 | A1 | * | 5/2007  | He        | G06K 7/10    |
|              |    |   |         |           | 235/462.15   |
| 2010/0315531 | A1 |   | 12/2010 | Bell et al. |            |
| 2011/0101101 | A1 |   | 5/2011  | Ye et al. |              |
| 2011/0309150 | A1 | * | 12/2011 | Jovanovski | G06K 7/10554 |
|              |    |   |         |           | 235/462.06   |
| 2012/0111944 | A1 | * | 5/2012  | Gao       | G06K 7/10861 |
|              |    |   |         |           | 235/462.01   |
| 2014/0166758 | A1 |   | 6/2014  | Goren     |              |

(Continued)

FOREIGN PATENT DOCUMENTS

CN          104680110 A        6/2015

OTHER PUBLICATIONS

International Search Report and Written Opinion for International Application No. PCT/US2019/041116 dated Nov. 13, 2019.

*Primary Examiner* — Paultep Savusdiphol
(74) *Attorney, Agent, or Firm* — Yuri Astvatsaturov

(57) ABSTRACT

A method and apparatus for calibrating a client computing device for decoding symbols includes an imaging assembly for capturing images of a symbol of known size and density. Each image, or set of images, is captured using a different setting or value of a parameter of the imaging assembly of the client computing device. Each image, or set of images, is decoded, and the fastest decode-time determines the default settings/values for the parameters.

21 Claims, 7 Drawing Sheets

(56) References Cited

U.S. PATENT DOCUMENTS

2017/0286732 A1 10/2017 Lei et al.
2018/0137318 A1* 5/2018 Canini ............... G06K 7/10811

* cited by examiner

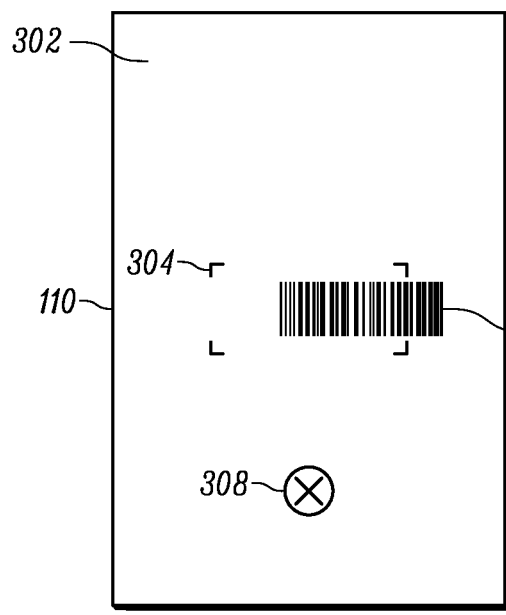
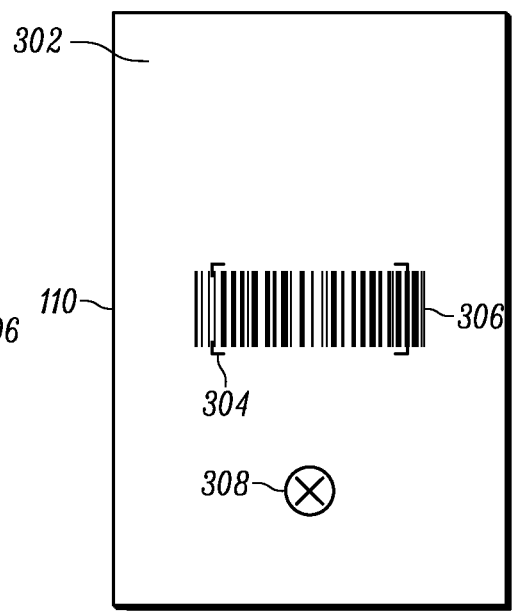
FIG. 2A
FIG. 2B
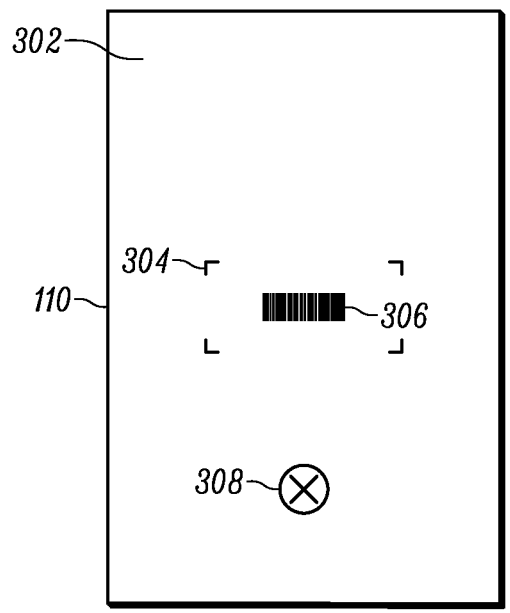
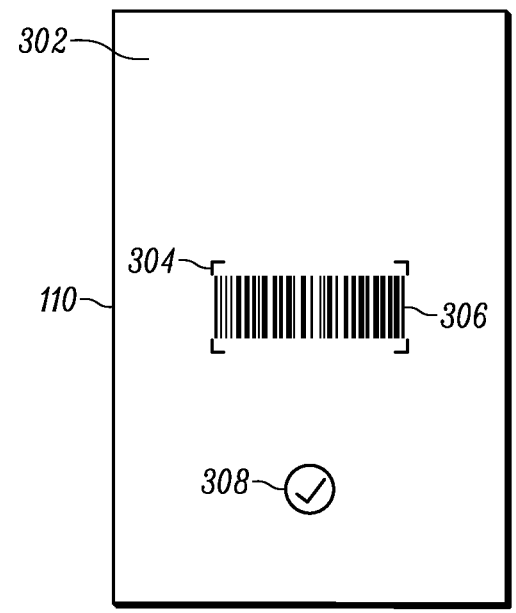
FIG. 2C
FIG. 2D

METHOD AND APPARATUS FOR CALIBRATING A CLIENT COMPUTING DEVICE FOR DECODING SYMBOLS

BACKGROUND OF THE INVENTION

Various software and applications allow client computing devices, such as smartphones, tablets, and the like, to read barcodes using a camera of the client computing device. However, the default parameter settings for the camera of many computing devices are optimized for capturing images to be viewed by a human eye. These default parameter settings are often not acceptable for scanning barcodes. For example, the default settings for a smartphone camera often result in slow performance when decoding a barcode captured in an image, because the image is not optimized for barcode decoding. Even if the parameter settings are modified for barcode scanning, the optimal parameter settings for barcode scanning vary from one client computing device to another, often depending on the manufacturer and/or model of the client computing device. Moreover, while a human may naturally optimize the parameters for capturing an image for the human eye, humans do not optimize the parameters for barcode scanning and decoding.

Accordingly, there is a need for devices, systems, and methods for calibrating different client computing devices to optimize the parameter settings for scanning and decoding barcodes.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 2A-2D are display screens of a client computing device for prompting a user of the client computing device to scan a symbol for calibration in accordance with an embodiment.

Figure 1A:
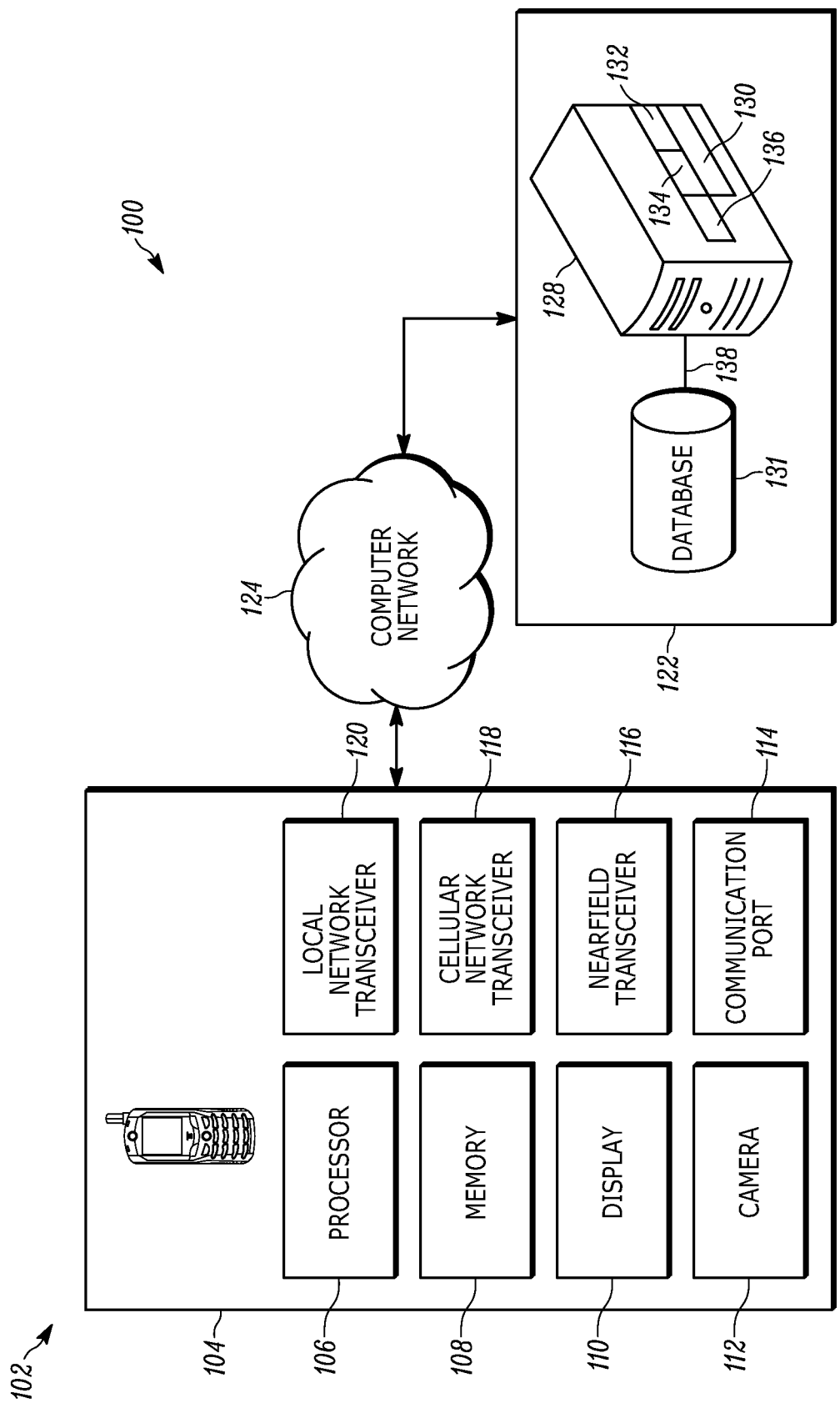
FIG. 1A is a block diagram of a communication system in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure provides a client computing device that includes a housing, a display positioned within the housing, an imaging assembly positioned within the housing, and a controller operatively coupled to the imaging assembly. The imaging assembly includes an image sensor, and is configured to capture images of a symbol using a plurality of parameters. The controller is configured to decode a first symbol in a first image captured by the image sensor at a first setting of a first one of the plurality of parameters, decode the first symbol in a second image captured by the image sensor at a second setting of the first one of the plurality of parameters, and determine the faster of: 1) the decode-time of the first symbol in the first image, and 2) the decode-time of the first symbol in the second image, as the setting of the first one of the plurality of parameters to decode a second symbol.

A further aspect of the present disclosure provides a client computing device that includes a housing, a display positioned within the housing, an imaging assembly positioned within the housing, and a controller operatively coupled to the imaging assembly. The imaging assembly includes an image sensor, where the imaging assembly is configured to capture images of a symbol using a plurality of parameters. The controller is configured to sequentially decode a plurality of images of a first symbol captured by the image sensor, where each image is captured using a different combination of settings of the plurality of parameters, and determine a combination of the settings of the plurality of parameters with the fastest time-to-decode the first symbol as the combination of settings of the plurality of parameters to decode a second symbol in an image captured by the image sensor.

Another aspect of the present disclosure provides a calibration method for a client computing device, that includes providing a client computing device having a camera configured to capture an image, instructing a user of the client computing device to position a symbol of predetermined size and/or density a predetermined distance from the camera, and scanning the symbol a plurality of times with the camera. Each scan has a value of a scanning parameter changed. The method continues with decoding the symbol in each scan, determining the decode-time for each decode of the symbol in each scan, and choosing the value of the scanning parameter of the scan with the fastest decode-time as a default setting for scanning and decoding subsequent symbols.

Yet another aspect of the present disclosure provides a calibration method for a client computing device that includes providing a client computing device having a camera configured to capture an image, instructing a user of the client computing device to position a symbol of predetermined size and/or density a predetermined distance from the camera, and scanning the symbol a plurality of times with the camera. Each scan has a value of a scanning parameter changed and includes a plurality of images of the symbol captured by the camera. The method continues decoding the symbol in each scan, averaging decode-times of the symbol in the plurality of images in each scan, and choosing the value of the scanning parameter of the scan with the fastest average decode-time as a default setting for scanning and decoding subsequent symbols.

Referring now to the drawings, FIG. 1A illustrates various aspects of an exemplary architecture implementing a system 100 for calibrating a client computing device to scan different symbologies, such as barcodes. The high-level architecture includes both hardware and software applications, as well as various data communication channels for communicating data between the various hardware and software components.

The system 100 for calibrating a client computing device to scan different symbologies includes front end components 102, including a client computing device 104 that is able to capture images of symbols and decode the symbols. The client computing device 104 may include a personal computer, a smart phone, a tablet computer, a smart watch, a head mounted display, a wearable computer or other suitable client computing device. The client computing device 104 includes various components that are operatively coupled to one another, including a controller, which includes a microcontroller or a processor 106, a program memory 108, a display 110 and an imaging assembly 112, such as a camera, which has an image sensor, all of which are interconnected via an address/data bus (not shown). The processor 106 of the client computing device 104 executes instructions stored in the memory 108 to: 1) generate images on the display 110 and 2) capture images via the imaging assembly 112. In particular, the controller 106 executes computer-executable instructions stored in the memory 108 to capture images of symbols, such as barcodes, and decode the symbols captured by the imaging assembly 112 in order to decode information encoded within the symbol. Examples of such instructions include QR code reader applications and barcode reader applications. It should be appreciated that although FIG. 1A depicts only one client computing device 104, the system 100 may include multiple client computing devices 104 communicating with the backend components 122. Further, although FIG. 1A depicts only one processor 106, the controller may include multiple processors 106. Similarly, the memory 108 of the controller may include multiple RAMs and multiple program memories storing one or more corresponding server application modules, according to the controller's particular configuration. The memory 108 may be implemented in a known form of computer storage media, including but not limited to, semiconductor memories, magnetically readable memories, and/or optically readable memories, for example, but does not include transitory media such as carrier waves.

The client computing device 104 also includes various communication components, including a hardwire communication port 114, such as a Universal Serial Bus (USB), and/or a wireless nearfield transceiver 116, such as a Bluetooth® transceiver, for communicating with other front end components. Further, the client computing device 104 includes a cellular network transceiver 118 and/or a local network transceiver 120, such as a WiFi transceiver based on IEEE (Institute of Electrical and Electronics Engineers) 802.11 standards, for communicating with backend components 122 via a computer network 124.

In an embodiment, the processor 106 of the client computing device 104 executes instructions to manage and transmit data to the backend components 122 via the computer network 124, such as data associated with decoding a symbol captured in an image by the imaging assembly 112. More particularly, the data may include calibration data for the particular make, model and operating system of the client computing device, where the calibration data represents the optimal parameter settings for the imaging assembly 112 to capture and decode images of symbols as determined from the disclosed calibration technique for the client computing device. In an embodiment, the optimal parameter settings are determined from one or more parameter settings that result in the fastest time-to-decode a symbol using the disclosed calibration technique. Examples of calibration data sent from the client computing device 104 to the backend components include, but are not limited to, a serial number associated with the client computing device 104, a model number of the client computing device 104, the manufacturer of the client computing device 104, focus parameter, exposure value, image size, image resolution, and/or shape correction. The processor of the client computing device 104 may further execute instructions to manage and receive data from the back end components 122 via the computer network 124, such as calibration data for the particular make, model and operating system of the client computing device 102.

The computer network 124 may be a network such as the Internet or other type of suitable network (e.g., local area network (LAN), a metropolitan area network (MAN), a wide area network (WAN), a mobile, a wired or wireless network, etc.). The computer network 124 may also be one or more cellular networks such as code division multiple access (CDMA) network, GSM (Global System for Mobile Communications) network, WiMAX (Worldwide Interoperability for Microwave Access) network, Long Term Evolution (LTE) network, etc.

The back end components 122 may include a data server 128 and an calibration database 131. The back end components 122 may communicate with each other through a communication network 138 such as a local area network or other type of suitable network (e.g., the Internet, a metropolitan area network (MAN), a wide area network (WAN), a mobile, a wired or wireless network, a private network, a virtual private network, etc.).

The system for calibrating a client computing device in general, and the data server 128 in particular, includes computer-executable instructions 130. A processor of the data server 128 executes the instructions 130 to instantiate an access tool 132, a retrieval tool 134 and an analysis tool 136. The access tool 132 receives data from the client computing device 104 and saves the data to one or more databases, such as the calibration database 131. The retrieval tool 134 retrieves data from the calibration database 131 or uses an identifier to access customer information from the calibration database 131 relating to calibration data for a client computing device, such as calibration data specific to the make, model and operating systems of the client computing device. The calibration database 131 may be a data storage device such as random-access memory (RAM), hard disk drive (HDD), flash memory, flash memory such as a solid state drive (SSD), etc. The analysis tool 136 may perform one or more analyses on the customer account data and/or requests from the client computing device 104 before providing calibration data to the client computing device.

Figure 1B:
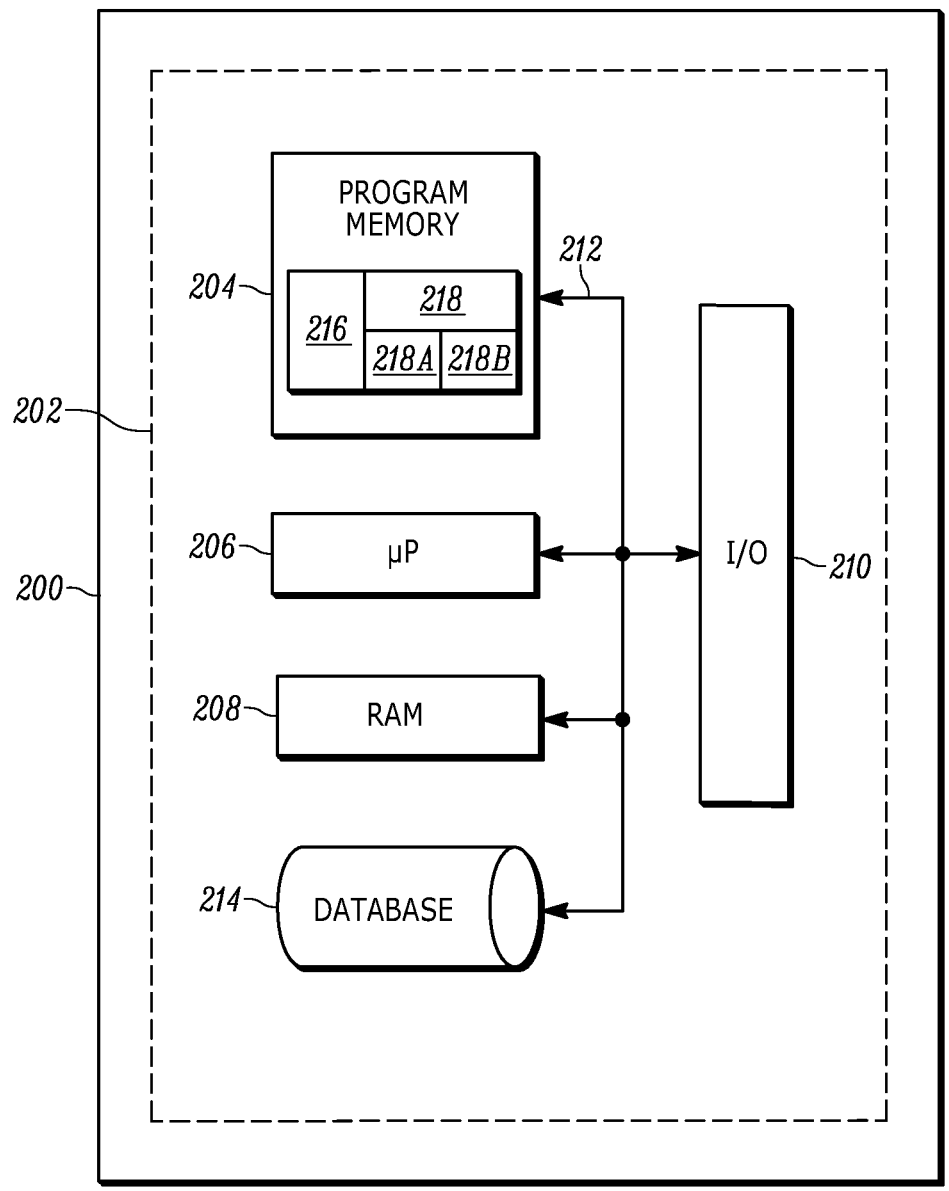
FIG. 1B is a block diagram of a client computing device in accordance with an embodiment.

Referring now to FIG. 1B, a data system 200 includes a controller 202. Exemplary data systems 200 include the client computing device 104 and/or the data server 128 as illustrated in FIG. 1A. The controller 202 includes a program memory 204, a microcontroller or a microprocessor (µP) 206, a random-access memory (RAM) 208, and an input/output (I/O) circuit 210, all of which are interconnected via an address/data bus 212. The program memory 204 may store computer-executable instructions, which may be executed by the microprocessor 206. In some embodiments, the controller 202 may also include, or otherwise be communicatively connected to, a database 214 or other data storage mechanism (e.g., one or more hard disk drives, optical storage drives, solid state storage devices, etc.). It should be appreciated that although FIG. 1B depicts only one microprocessor 206, the controller 202 may include multiple microprocessors 206. Similarly, the memory 204 of the controller 202 may include multiple RAMs 216 and multiple program memories 218, 218A and 218B storing one or more corresponding server application modules, according to the controller's particular configuration.

Although FIG. 1B depicts the I/O circuit 210 as a single block, the I/O circuit 210 may include a number of different types of I/O circuits (not depicted), including but not limited to, additional load balancing equipment, firewalls, etc. The RAM(s) 216, 208 and the program memories 218, 218A and 218B may be implemented in a known form of computer storage media, including but not limited to, semiconductor memories, magnetically readable memories, and/or optically readable memories, for example, but does not include transitory media such as carrier waves.

Referring to FIGS. 2A-2D, an embodiment of a display screen for prompting a user of a client computing device to scan a symbol for calibration is depicted. Upon instantiating the calibration technique as stored on the client computing device 104, the processor 106 causes the display 110 to generate a graphic 302 thereon that includes a boundary 304 into which an image 306 of a symbol should be positioned for calibrating the client computing device 102. The boundary 304 corresponds to the size of the image 306 of the symbol that is to be captured by imaging assembly 112 of the client computing device 104 in order to calibrate the client computing device 104. More particularly, the symbology of the particular symbol used to calibrate the client computing device 104 has a known size and density. For example, the x-dimension and y-dimension in a one-dimensional barcode determines the size of that barcode symbology, and the number of bars per inch in the x-dimension determines the density. The barcode known as UPC (Universal Product Code), also referred to as UPC-A, has a known nominal x-dimension of 37.31 millimeters and a nominal y-dimension of 25.91 millimeters, with a density that has the narrowest element being 0.013 inches. The display screen may include a prompt for the user to place the image 306 of the symbol within the boundary such that the left and right edges of the image 306 of the symbol touch the left and right lines of the boundary 304.

Positioning the image 306 of the symbol to fit the boundary 304 allows the processor 106 to determine the approximate distance of the actual symbol from the imaging assembly 112. This allows the calibration technique for the client computing device 104 to use the image 306 of the symbol as a baseline for calibrating the parameter settings of the client computing device 104 to optimize decoding of the symbol, because the image 306 of the symbol corresponds to the known size and density of the actual symbol. Thus, by having the client computing device 104 calibrated to know the size and density of the image 306 of the symbol, the client computing device 104 may be calibrated to know that the decode-time of the symbol should be below a particular threshold (e.g., 100-200 milliseconds), such that any scans of the symbols during the calibration process that are less than the threshold are discarded by the client computing device 104.

As shown in FIGS. 2A-2D, the boundary 304 assists in aligning the image of the symbol 306, as will be captured by the imaging assembly 112, on the display 110. For example, in FIG. 2A, the image 306 of the symbol is not aligned within the boundary 304, and the display screen 302 provides an indication 308 that the image 306 of the symbol is not suitable for scanning for decode calibration. In FIG. 2B, the image 306 of the symbol is generally aligned with the boundary 304, but in this case the image 306 of the symbol is too large, such that image captures (scans) of the symbol would not correspond to the known size and density of the actual symbol, and the indication 308 reflects that the image 306 is not suitable. Similarly, in FIG. 2C, the image 306 of the symbol is generally within the boundary 304, but the image 306 is too small, which, again, means that image captures of the symbol would not correspond to the known size and density of the actual symbol. Again, the indication 308 reflects that the image is not suitable. On the other hand, as shown in FIG. 2D, the image 306 of the symbol is within the boundary 304 and generally corresponds to the size of the boundary 304, such that the image 306 of the symbol on the display 110 corresponds to the image data of the symbol as will be captured by the imaging assembly 112, which, in turn, corresponds to the known size and density of the actual symbol. The indication 308 reflects that the image 306 of the symbols is suitable for calibrating the client computing device 104 for decoding symbols, at least of the type corresponding to the symbol being used for calibration.

Figure 3:
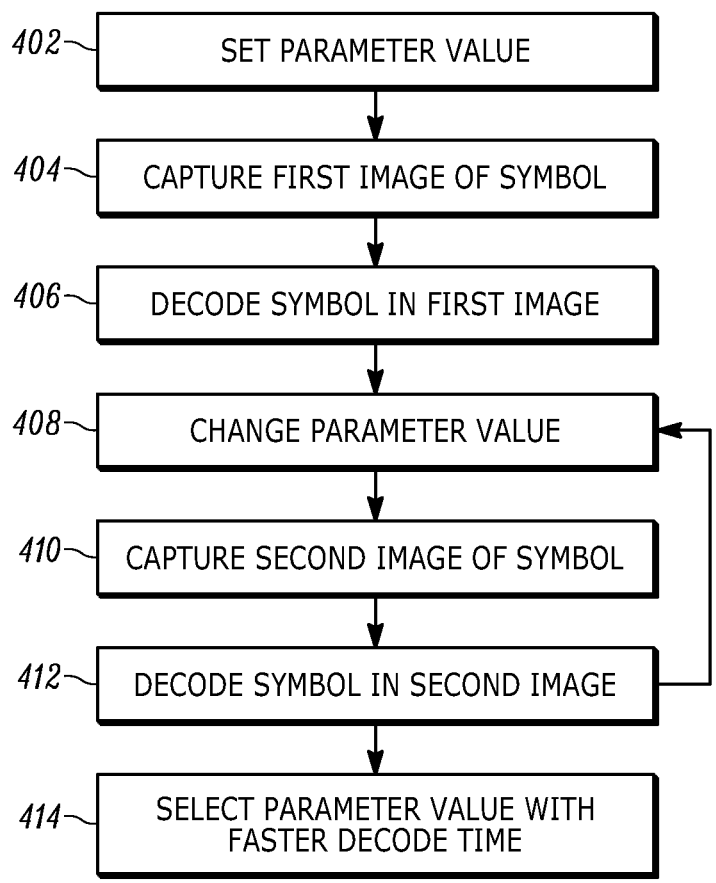
FIG. 3 is a flowchart of a method of calibrating a client computing device to decode symbols in accordance with an embodiment.
Figure 4:
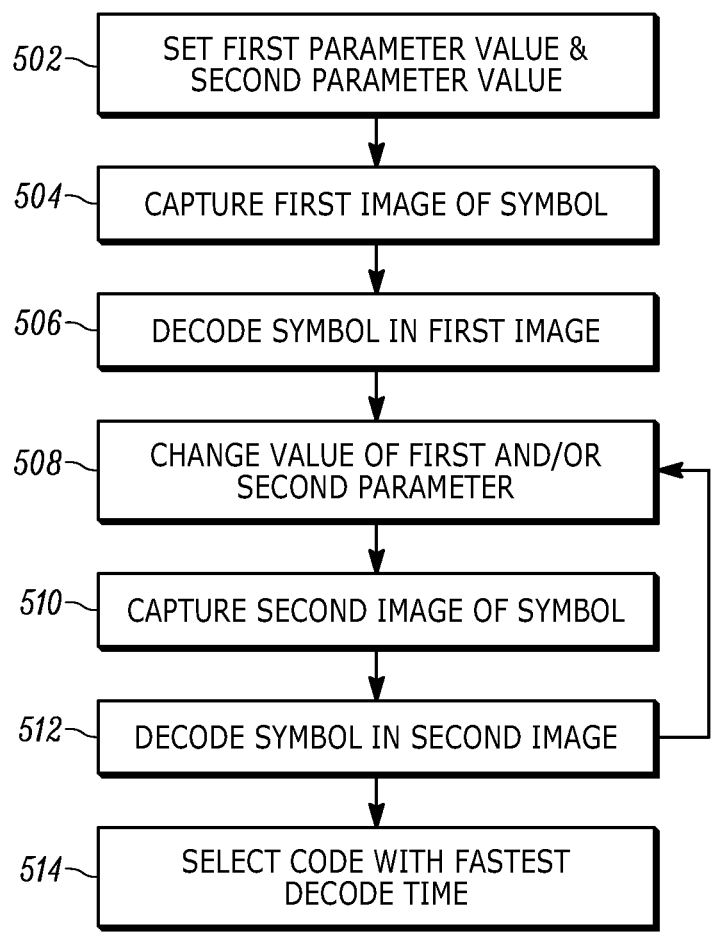
FIG. 4 is a flowchart of a method of calibrating a client computing device to decode symbols in accordance with another embodiment.
Figure 5:
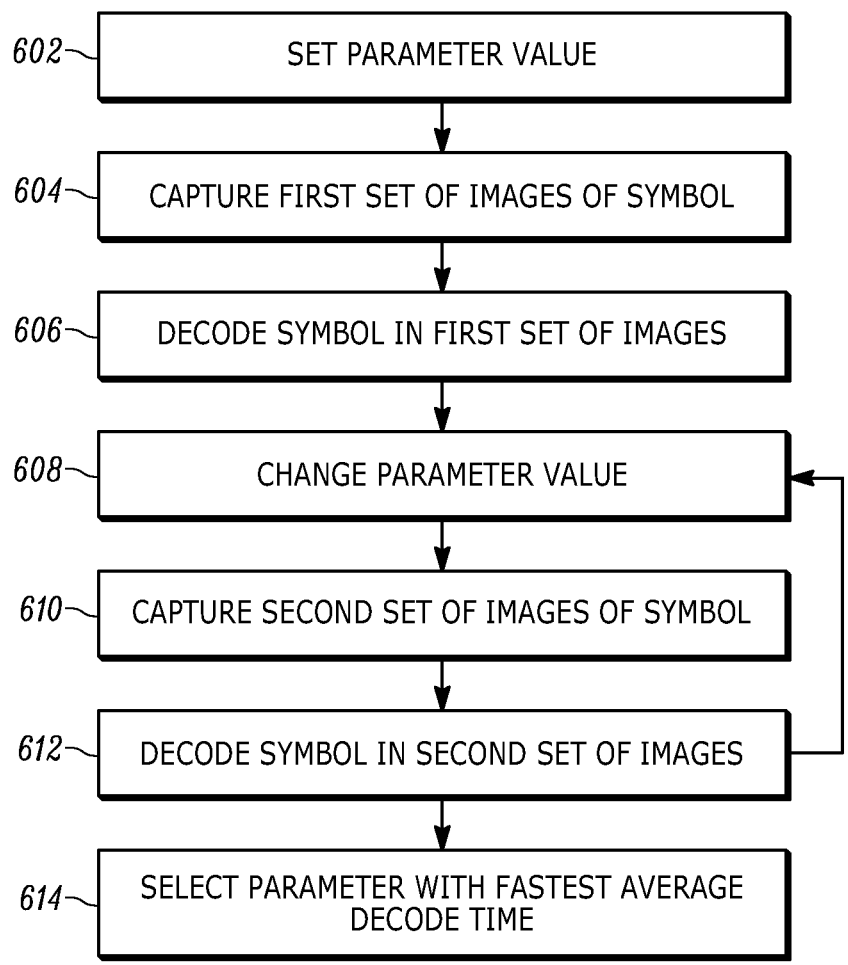
FIG. 5 is a flowchart of a method of calibrating a client computing device to decode symbols in accordance with yet another embodiment.

FIGS. 3-5 are embodiments of routines for calibrating the parameter settings of a client computing device in order to efficiently capture and decode other symbols. It should be noted that the calibrated parameters settings do not necessarily correspond to the default parameter settings for a captured image as viewed by the human eye (e.g., photographs). Rather, the calibrated parameter settings allow the controller to quickly process and properly decode the symbol, such that the calibration method is looking for a reduced or minimum quality of picture needed to decode the symbol, as opposed to the best quality of picture as viewed by the human eye. Though parameter settings optimized for the human eye may sometimes allow a symbol to be decoded, it often results in slower performance of the client computing device when it comes to decoding. Indeed, many parameter settings calibrated for improved decoding are not discernible by the human eye, and vary from one make/model of client computing device to another.

Generally speaking, using a suitable image 306 of a symbol as a baseline as determined above, the routines capture one or more images of the symbol. With each captured image (or series of images using the same parameter settings) the routines decode the symbol captured in the image(s), with the time-to-decode being recorded. In the case of a series of images using the same parameter settings, the decode-time may be averaged.

With each subsequently captured image, or series of images, the routines vary a parameter setting or combination of parameter settings that the imaging assembly 112 uses to capture images, capture the image(s) and decode the symbol in the image(s). Examples of the parameters include, but are not limited to, focus (e.g., fixed (at a predetermined focal distance), automatic, continuous, video), exposure value, image size, image resolution, illumination intensity, ISO, aperture size, and shape correction (which corrects for image distortion, and is generally turned off for decoding). In an embodiment, the routines may initially vary a primary parameter setting, such as focus, keeping all other parameter settings static, before moving on to varying a secondary parameter, such as the exposure value, and keeping the remaining parameter settings static.

The routines then select the parameter setting(s)/value(s) that results in the fastest decode-time. In an embodiment, the routines capture and decode a set of images of the symbol at different parameter settings (e.g., for a set number of parameters, for all settings of a particular parameter, for a set amount of images, etc.), and then select from among only those parameter settings/values that result in a decode-time less than a threshold amount of time (e.g., 100-200 milliseconds). In another embodiment, the routines may select the first parameter setting or combination of settings that results in a decode-time of less than the threshold amount. In yet another embodiment, the routines may continue to capture images of the symbol, vary the parameter settings and decode the symbols in the images for a set amount of time (e.g., 30 seconds), and select the parameter settings associated with the fastest decode-time within that timeframe as the default parameter settings for decoding symbols. In the event the routines are unable to successfully decode the image of the symbol or unable to successfully decode the image of the symbol within a predetermined time, thereby resulting in an unusable decode-time, each routine may determine that the decode was unsuccessful, and proceed to continue capturing successive images with different parameter value(s) in order to make a proper determination of the fastest decode-time.

In each embodiment, the calibration routines may be executed entirely by the controller of the client computing device 104 or in part by the data server 128. For example, the client computing device 104 may be tasked with capturing images of the symbol, decoding the images in the symbol, and transmitting calibration data (e.g., decode-time, parameter settings, etc.) to the server 128, and the server 128 may be tasked with determining which parameter settings are most optimal for decoding symbols using the client computing device.

Referring to FIG. 3, using a suitable image 306 of a symbol as a baseline, as determined above, an embodiment of the calibration routine is shown in which images of the symbol are captured by the imaging assembly 112, with a setting of a particular parameter (e.g., focus) being changed with each image capture, and the symbol of each captured image being decoded to determine the parameter setting that results in the fastest decode-time. Beginning at block 402, the routine sets the value for a particular parameter setting. For example, the primary parameter of the imaging assembly 112 may be "focus", and the initial setting may be "automatic". Using this parameter setting, the imaging assembly captures an image of the symbol at block 404. Having captured the image of the symbol, the symbol is decoded at block 406.

Thereafter, the routine changes the parameter setting at block 408. For example, if the parameter is "focus" with the first setting being "automatic", the routine may change this to "fixed" at block 408 with the focus being fixed to a predetermined focal length. A second image of the symbol is then captured at block 410 using this second parameter setting/value, and the symbol in the second image is decoded at block 412. The routine may continue to capture images of the symbol, each time changing the value/setting of the parameter. In an embodiment, the same parameter (e.g., focus) is changed each time, until all values/settings have been used to capture images of the symbol, and then the routine may move to the second parameter (e.g., exposure value), changing the value for that parameter with each successive capture of the image of the symbol, and keeping the first parameter setting/value that resulted in the fastest decode-time static.

Provided the symbols captured in the images are successfully decoded at blocks 406, 412, the routine may either wait for a set of images of the symbol that have been captured and decoded, or simultaneously analyze an image of the symbol that has been captured and decoded as other images of the symbol are being captured and decoded. In either instance, the routine selects the parameter value/setting that results in the fastest decode-time at block 414. As mentioned above, the determination of parameter setting/value for capturing and decoding subsequent symbols may be limited to those that result in less than a minimum threshold decode-time (e.g., 100-200 milliseconds), and then select the parameter setting/value with the fastest decode-time. In an embodiment in which the routine simultaneously analyzes an image as other images of the symbol are being captured and decoded, the routine may select the first parameter setting/value that meets the threshold. This selected parameter value/setting is then used as the default setting for capturing subsequent symbols.

Referring to FIG. 4, an alternative embodiment of the calibration routine is shown in which images of the symbol are captured by the imaging assembly 112, with combinations of parameter settings/values being varied with each image capture, and the symbol in each captured image being decoded to determine a combination of parameter settings/values that results in the fastest decode-time. Beginning at block 502, the routine sets the value for two or more parameters. For example, the primary two parameters of the imaging assembly 112 may be "focus" and "exposure value", and the settings or values may be "automatic" and "7", respectively. Using this combination of parameter settings, the imaging assembly captures an image of the symbol at block 504. Having captured the image of the symbol, the symbol is decoded at block 506.

Thereafter, the routine changes at least one of the two parameter settings at block 508. For example, if the first parameter is "focus" with the first setting being "automatic" and the second parameter is "exposure value" with the first value being "7", the routine may change these to "fixed" to a particular focal distance and/or "8", respectively, at block 508. A second image of the symbol is then captured at block 510 using this second parameter setting/value combination, and the symbol in the second image is decoded at block 512. The routine may continue to capture images of the symbol, each time changing the combination of parameter settings/values. In an embodiment, a combination of the primary parameters (e.g., focus and exposure value) is changed each time, until all combinations of the primary parameters have been used to capture images of the symbol, and then the routine may move to the secondary parameters (e.g., image size, image resolution, shape correction, etc.), changing the value for those parameters with each successive capture of the image of the symbol. In another embodiment, previous calibrations may determine the order in which different combinations should be tried, with combinations of parameter settings/values having a higher probability of decoding the symbol in less than a threshold time (e.g., less than 100-200 milliseconds) being used in the calibration routine before using combinations of parameter settings/values that have a lower probability of decoding the symbol in less than the threshold time.

Provided the symbols captured in the images are successfully decoded at blocks 506, 512, the routine may either wait for a set of images of the symbol that have been captured and decoded, or simultaneously analyze an image of the symbol that has been captured and decoded as other images of the symbol are being captured and decoded. In either instance, the routine selects the parameter value/setting combination that results in the fastest decode-time at block 514. As mentioned above, the determination of parameter setting/value combinations for capturing and decoding subsequent symbols may be limited to those that meet a minimum threshold decode-time (e.g., 100-200 milliseconds), and then select the parameter setting/value combination with the fastest decode-time. In an embodiment in which the routine simultaneously analyzes an image as other images of the symbol are being captured and decoded, the routine may select the first parameter setting/value combination that meets the threshold. This values/settings in the selected parameter value/setting combination are then used as the default settings/values for capturing subsequent symbols.

Referring to FIG. 5, yet another embodiment of the calibration routine is shown in which a series or set of images of the symbol are captured by the imaging assembly 112 using the same parameter settings/values, the symbol in each captured image being decoded, and the average decode-time of each series or set of images being used to determine the parameter settings/values that result in the fastest decode-time. Beginning at block 602, the routine sets the value for a particular parameter setting/value or combination of parameter settings/values, as described above for FIGS. 3 and 4. Using this parameter setting/value or combination of parameter settings/values, the imaging assembly 112 captures a series or set of images of the symbol at block 604. Having captured the images of the symbol, the symbol is decoded in each image at block 606.

Thereafter, the routine changes the parameter setting/value or combination of parameter settings/values at block 608, similar to the changes made at blocks 408, 508 of FIGS. 3 and 4, respectively. A second series or set of images of the symbol is then captured at block 610 using this second parameter setting/value or second combination of parameter settings/values, and each symbol in the second set or series of images is decoded at block 612. The routine may continue to capture series or sets of images of the symbol, each time changing the value/setting of the parameter or combination of parameter settings/values as above for FIGS. 3 and 4.

Provided the symbols captured in the images are successfully decoded at blocks 606, 612, the routine may either wait for all sets/series of images of the symbol that have been captured and decoded, or simultaneously analyze each series or set of images of the symbol that has been captured and decoded as other sets/series of images of the symbol are being captured and decoded. In either instance, the routine averages the decode-time of each set or series of images, and selects the parameter value/setting or combination of parameter values/settings that results in the fastest average decode-time at block 614. Again, the determination of parameter settings/values for capturing and decoding subsequent symbols may be limited to those averages that are less than a minimum threshold decode-time (e.g., 100-200 milliseconds), and then select the parameter settings/values with the fastest average decode-time. In an embodiment in which the routine simultaneously analyzes a series or set of image as other series or sets of images of the symbol are being captured and decoded, the routine may select the first parameter setting/value that meets the threshold. This selected parameter value/setting or combination of parameter values/settings is then used as the default setting(s) for capturing subsequent symbols.

Figure 6:
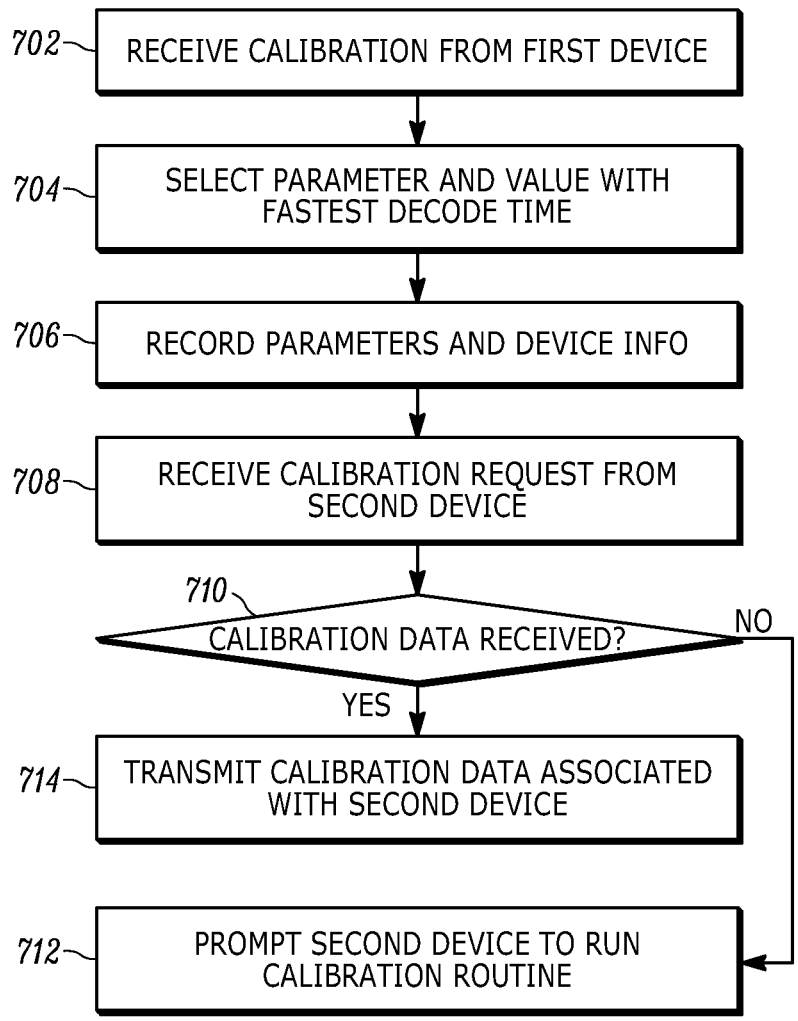
FIG. 6 is a flowchart of a method of calibration data management in accordance with an embodiment.

FIG. 6 is an embodiment of a calibration data management routine executed by the data server 128. Generally, the data server 128 receives calibration data from the client computing device, and stores this information in the calibration database 131. Thereafter, other client computing devices transmit their make, model and operating system information with a request for calibration data to the data server 128. If the data server 128 has calibration data stored in the calibration database 131 for the make, model and operating system of a requesting client computing device, the data server 128 transmits the calibration data to the requesting client computing device. If not, the data server 128 prompts the requesting client computing device to execute a calibration routine, as described above, and provide the resulting calibration data to the data server 128.

Referring to FIG. 6, the calibration data management routine begins by receiving calibration data from a client computing device at block 702, using, for example, the access tool 132. As noted above, FIG. 1A shows only one client computing device in communication with the data server 128, though calibration data may differ from one client computing device to another, depending on the make, model and operating system of the client computing device. As such, several client computing devices of a variety of makes and models may be in communication with the data server 128, and the data server 128 may receive calibration data from a variety of makes and models of client computing devices. The calibration data may include, but is not limited to, the make, model and operating system of the client computing device as well as the parameter settings/values for decoding symbols as determined from the calibration routine executed by the client computing device. The parameter settings/values may be those that are associated with the fastest decode-time as determined by the client computing device. Alternatively, the parameter settings/values may be multiple sets of parameter settings/values associated with multiple decode-times as determined by the client computing device (e.g., the 10 fastest decode-times and corresponding parameter settings/values).

At block 704, the data server 128, using, for example, the analysis tool 136, selects those parameter settings/values that result in the fastest decode-time of the symbol during the calibration routine. In one example, the data server 128 selects the parameter settings/values with the fastest decode-time from multiple sets of parameter settings/values and decode-times as transmitted by the client computing device at block 702. In another example, the data server 128 may selected the parameter settings/values with the fastest decode-time as received from multiple client computing devices of the same make, model and operating system. That is, client computing devices of the same make, model and operating system may execute the calibration routine and determine different parameter settings/values, and the data server 128 may select and update calibration data for that particular make, model and operating system of client computing device as faster decode-times are determined and received.

The calibration data is recorded in the calibration database 131 using, for example, the access tool 132 at block 706. Thereafter, the data server 128 receives a request for calibration data via, for example, the access tool 132, from another client computing device at block 708. The request may include, but is not limited to, the make, model and operating system of the client computing device. Using this data, the data server 128 accesses the calibration database 131 at block 710 to determine if a record of calibration data exists for that particular make, model and operating system of client computing device. If not, the data server 128 may prompt the requesting client computing device to execute the calibration routine, and provide the results to the data server 128 so as to generate a record of the parameter settings/values associated with that particular make, model and operating system of client computing device. On the other hand, if a record of calibration data exists in the calibration database 131 for the make, model and operating system of the requesting client computing device, the data server 128 retrieves the corresponding calibration data using, for example, the retrieval tool 134, and transmits the calibration data to the requesting client computing device at block 714. Thereafter, the requesting client computing device may use the parameter settings/values from the calibration data as default settings/values for decoding a symbol.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A client computing device comprising:
a housing;
a display positioned within the housing;
an imaging assembly positioned within the housing and comprising an image sensor, wherein the imaging assembly is configured to capture images of a symbol using a plurality of parameters; and
a controller operatively coupled to the imaging assembly, the controller configured to:
decode a first symbol in a first image captured by the image sensor at a first setting of a first one of the plurality of parameters;
decode the first symbol in a second image captured by the image sensor at a second setting of the first one of the plurality of parameters; and determine the faster of: 1) the decode-time of the first symbol in the first image, and 2) the decode-time of the first symbol in the second image, as the setting of the first one of the plurality of parameters to decode a second symbol.

2. The client computing device of claim 1, wherein the controller is configured to:
   decode the first symbol in the first image captured by the image sensor at the first setting of the first one of the plurality of parameters and at a first setting of a second one of the plurality of parameters;
   decode the first symbol in the second image captured by the image sensor at the second setting of the first one of the plurality of parameters and at the first setting of the second one of the plurality of parameters; and
   determine the faster of: 1) the decode-time of the first symbol in the first image, and 2) the decode-time of the first symbol in the second image, as a combination of the settings of the first and second ones of the plurality of parameters to decode the second symbol.

3. The client computing device of claim 2, wherein the controller is configured to:
   decode the first symbol in a third image captured by the image sensor at the second setting of the first one of the plurality of parameters and at a second setting of the second one of the plurality of parameters; and
   determine the faster of: 1) the decode-time of the first symbol in the first image, 2) the decode-time of the first symbol in the second image, 3) the decode-time of the first symbol in the third image, as the combination of the settings of the first and second ones of the plurality of parameters to decode the second symbol.

4. The client computing device of claim 2, wherein the first parameter is focus and the second parameter is exposure value.

5. The client computing device of claim 1, wherein the first symbol comprises at least one of a known size and a known density, and wherein the controller is configured to cause the display to generate an image of a graphic indicating a boundary in which to position an image of the first symbol on the display, the image of the first symbol on the display being representative of image data of the first symbol captured by the image sensor, the boundary corresponding to a size of the image of the symbol on the display, which in turn corresponds to a known distance of the first symbol from the imaging assembly.

6. The client computing device of claim 1, wherein the first symbol comprises one of a: 1) one-dimensional barcode, and 2) a two-dimensional barcode, and wherein the controller is configured to cause the display to generate a prompt to capture an image of the first symbol.

7. The client computing device of claim 1, wherein the controller is configured to reject a decode-time of the first symbol slower than a threshold value.

8. The client computing device of claim 7, wherein the threshold value is at least 100 milliseconds and no more than 200 milliseconds.

9. A client computing device comprising:
   a housing;
   a display positioned within the housing;
   an imaging assembly positioned within the housing and comprising an image sensor, wherein the imaging assembly is configured to capture images of a symbol using a plurality of parameters; and
   a controller operatively coupled to the imaging assembly, the controller configured to:
      sequentially decode a plurality of images of a first symbol captured by the image sensor, each image captured using a different combination of settings of the plurality of parameters; and
      determine a combination of the settings of the plurality of parameters with the fastest time-to-decode the first symbol as the combination of settings of the plurality of parameters to decode a second symbol in an image captured by the image sensor.

10. The client computing device of claim 9, wherein the combination of parameters comprises one or more of the following: focus parameter, exposure value, image size, image resolution, and shape correction.

11. The client computing device of claim 10, wherein the controller is configured to first sequentially decode the plurality of images of the first symbol captured by the image sensor, each image captured using a different focus setting, and configured to then sequentially decode a plurality of images of a first symbol captured by the image sensor, each image captured using a different exposure value setting.

12. The client computing device of claim 9, wherein the first symbol comprises at least one of a known size and a known density, and wherein the controller is configured to cause the display to generate an image of a graphic indicating a boundary in which to position an image of the first symbol on the display, the image of the first symbol on the display being representative of image data of the first symbol captured by the image sensor, the boundary corresponding to a size of the image of the symbol on the display, which in turn corresponds to a known distance of the first symbol from the imaging assembly.

13. The client computing device of claim 9, wherein the first symbol comprises one of a: 1) one-dimensional barcode, and 2) a two-dimensional barcode, and wherein the controller is configured to cause the display to generate a prompt to capture an image of the first symbol.

14. A calibration method for a client computing device, the method comprising:
   providing a client computing device having a camera configured to capture an image;
   instructing a user of the client computing device to position a symbol of predetermined size and/or density a predetermined distance from the camera;
   scanning the symbol a plurality of times with the camera, each scan having a value of a scanning parameter changed;
   decoding the symbol in each scan;
   determining the decode-time for each decode of the symbol in each scan; and
   choosing the value of the scanning parameter of the scan with the fastest decode-time as a default setting for scanning and decoding subsequent symbols.

15. The calibration method of claim 14, further comprising causing a display on the client computing device to generate a prompt to use the default setting to scan a subsequent symbol.

16. The calibration method of claim 14, further comprising transmitting the decode-time of the symbol in each scan to a server, wherein choosing the setting with the fastest decode-time as a default setting comprises: choosing, by the server, the setting with the fastest decode-time as a default setting for scanning and decoding subsequent symbols.

17. The calibration method of claim 14, wherein choosing the setting with the fastest decode-time as a default setting comprises: choosing, by the client computing device, the setting with the fastest decode-time as a default setting for scanning and decoding subsequent symbols.

18. A calibration method for a client computing device, the method comprising:

providing a client computing device having a camera configured to capture an image;

instructing a user of the client computing device to position a symbol of predetermined size and/or density a predetermined distance from the camera;

scanning the symbol a plurality of times with the camera, wherein each scan has a value of a scanning parameter changed and comprises a plurality of images of the symbol captured by the camera;

decoding the symbol in each scan;

averaging decode-times of the symbol in the plurality of images in each scan; and choosing the value of the scanning parameter of the scan with the fastest average decode-time as a default setting for scanning and decoding subsequent symbols.

19. The calibration method of claim 18, further comprising causing a display on the client computing device to generate a prompt to use the default setting to scan a subsequent symbol.

20. The calibration method of claim 18, further comprising transmitting the average decode-time of the symbol in the plurality of images in each scan to a server, wherein choosing the value of the scanning parameter of the scan with the fastest decode-time as a default setting comprises:

choosing, by the server, the value of the scanning parameter of the scan with the fastest decode-time as a default setting for scanning and decoding subsequent symbols.

21. The calibration method of claim 18, wherein choosing the value of the scanning parameter of the scan with the fastest decode-time as a default setting comprises: choosing, by the client computing device, the value of the scanning parameter of the scan with the fastest decode-time as a default setting for scanning and decoding subsequent symbols.

* * * * *